Figure 1:
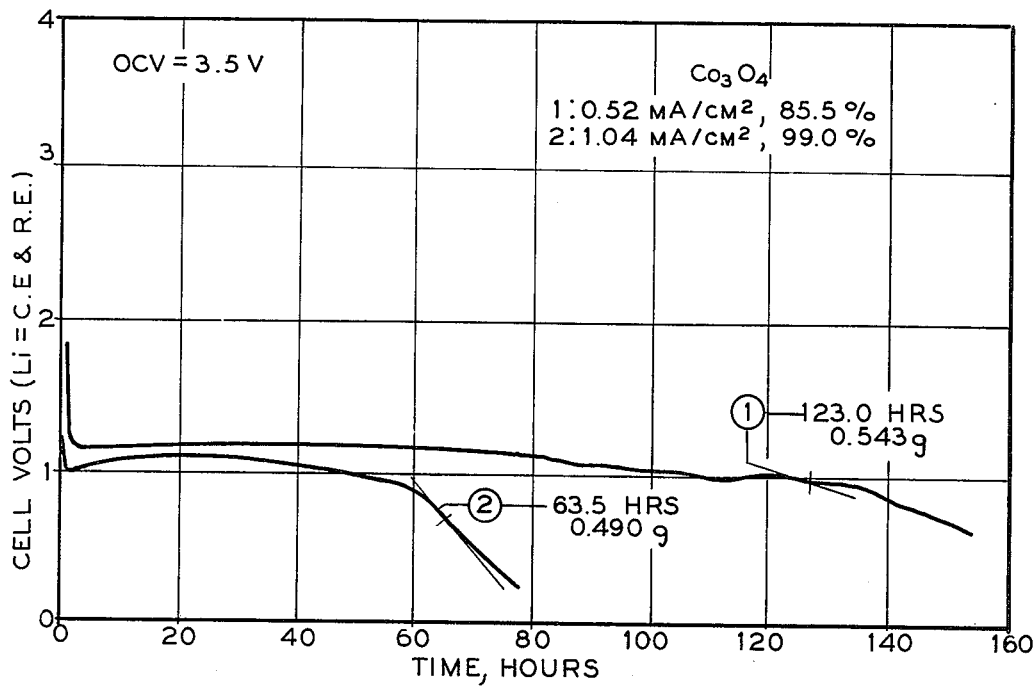

United States Patent [19]

Dey et al.

[11] 3,945,848

[45] Mar. 23, 1976

[54] LITHIUM-METAL OXIDE ORGANIC ELECTROLYTE SYSTEMS

[75] Inventors: Arabinda N. Dey, Needham; Robert W. Holmes, South Natick, both of Mass.

[73] Assignee: P. R. Mallory & Co. Inc., Indianapolis, Ind.

[22] Filed: June 24, 1974

[21] Appl. No.: 482,396

Related U.S. Application Data

[63] Continuation of Ser. No. 55,170, July 15, 1970, abandoned.

[52] U.S. Cl. ............ 136/100 R; 136/6 LN; 136/155
[51] Int. Cl.² ......................................... H01M 6/00
[58] Field of Search ................ 136/100, 6, 154, 155

[56] References Cited
UNITED STATES PATENTS

| | | | |
|---|---|---|---|
| 3,117,032 | 1/1964 | Panzer | 136/100 R |
| 3,248,265 | 4/1966 | Herbert | 136/100 R |
| 3,279,952 | 10/1966 | Minnick | 136/100 R |
| 3,415,687 | 12/1968 | Methlie | 136/100 R |
| 3,423,242 | 1/1969 | Meyers et al. | 136/6 |
| 3,468,716 | 9/1969 | Eisenberg | 136/100 R |
| 3,484,296 | 12/1969 | Buzzelli | 136/155 |

OTHER PUBLICATIONS

Research & Development of a High Capacity Nonaqueous Secondary Battery, N.A.S.A., Aug. 15, 1965, pp. 36-42.

*Primary Examiner*—T. Tung
*Assistant Examiner*—C. F. Lefevour
*Attorney, Agent, or Firm*—Israel Nissenbaum; Ronald Cornell; Charles Hoffmann

[57] ABSTRACT

This invention relates to a novel primary battery comprising at least one positive plate composed of cobalt, oxides and their mixtures, and at least one negative plate having a metal selected from the group of light metals, said plates being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, aceto-nitrile and the mixtures thereof, and having dissolved therein soluble salts of the light metals, for example, the perchlorates, hexafluorophosphates, tetrafluoroborates, tetrachloroaluminates, and hexafluoro arsenates of lithium.

5 Claims, 2 Drawing Figures

LITHIUM-METAL OXIDE ORGANIC ELECTROLYTE SYSTEMS

This application is a continuation of U.S. Ser. No. 55,170, filed July 15, 1970 now abandoned.

We have discovered that certain cobalt oxides can be cathodically discharged in organic electrolytes with high efficiency. These cobalt oxides were also found to be highly stable in the organic electrolytes. The materials were found to be exceedingly suitable for Li/Cobalt oxide organic electrolyte primary cells.

The objects of the invention are:

a. to provide Li/Cobalt oxide primary cells with high volumetric and gravimetric capacity, b. to provide primary cells with high utilization efficiency, c. to provide primary cells with long shelf life, d. to provide primary cells with relatively steady output voltage throughout the life of the cells, e. to provide primary cells which do not exhibit any spontaneous gassing during storage and during the operation of the cell, f. to provide a means for rendering useful in batteries cobalt oxides which have not been of any use in wet cells hitherto, because of their intrinsic deficiencies in the existing systems.

EXAMPLES

1. $Li/Co_3O_4$ cells were constructed in parallel plate configuration using two rectangular lithium anodes (lithium ribbon pressed on stainless steel) placed on both sides of a rectangular (2.27 cm × 0.95 cm) $Co_3O_4$ cathode, using one layer of filter paper separator on each side. The $Co_3O_4$ rectangular cathodes were constructed according to the method described below.

A mixture of 70% $Co_3O_4$ and 30% graphite by weight was throughly mixed using a "Waring" blender. The mix was then pelletized into small pellets using a pressure of 36 tons per square inch. The pellets were then broken mechanically to produce a granular mix. This mix was then treated with an aqueous Teflon dispersion (commonly known as colloidal Teflon) so that the amount of solid Teflon content was 3% by weight of the mix. This was then treated with isopropyl alcohol and mechanically kneaded to form a rubbery material. The rectangular cathodes were finally molded on expanded nickel current collector using the above rubbery mix by pressing with a force of 10,000 lbs. in a rectangular die. The apparent area of the finished cathode was 2.16 cm² on one side. The cathodes were then cured at 200°C for 2 hours.

The cells were packaged in a foil laminate (aluminum foil laminated with polyethylene) bag with 1M $LiClO_4$ in tetrahydrofuran (THF) electrolyte and were heat sealed.

The open circuit voltage of the cells were 3.5 volts. The cells were discharged at constant currents of 2.25 ma (0.52 ma/cm²) and 4.5 ma (1.04 ma/cm²). The typical discharge curves of the $Li/Co_3O_4$ cells are shown in FIG. 1. The voltage of the cells dropped quickly to 1.1 volts and remained relatively steady with the end of the discharge when the voltage dropped drastically below 0.8 volts. The material utilization efficiency of the cathode, based on the reaction $$Co_3O_4 + 8Li^+ + 8e \rightarrow 3 Co + 4Li_2O$$

was 85% at 0.52 ma/cm² and 99% at 1.04 ma/cm² current densities.

The recoverable volumetric capacity of the $Co_3O_4$ depolarizer was found to be over 5.2A hr./c.c. based on the active material. This was almost twice that of the theoretical volumetric capacity (2.8A hr/cc) of the $H_gO$ depolarizer. Furthermore, the $Li/Co_3O_4$ organic electrolyte system did not exhibit any gassing during storage or during operation, unlike that of the Zn/HgO alkaline systems.

The above properties made the system particularly suitable for application in the electric watches where a steady voltage (1.1 volt or so) was preferable. The absence of gassing was also found to be particularly desirable, as it prevented the bulging and leakage of the button type watch cells. Cells made in W-4 Mallory battery cans using $Li/Co_3O_4$ — 1M$LiClO_4$—THF system, were used successfully to operate an "Accutron" watch.

The use of $Co_3O_4$ in wet cells was not possible because of the polarization, low voltage and inefficient operation of the cathode in aqueous alkaline cells. These difficulties were overcome, in this invention, by the use of organic solvent and lithium metal anode.

Figure 2:
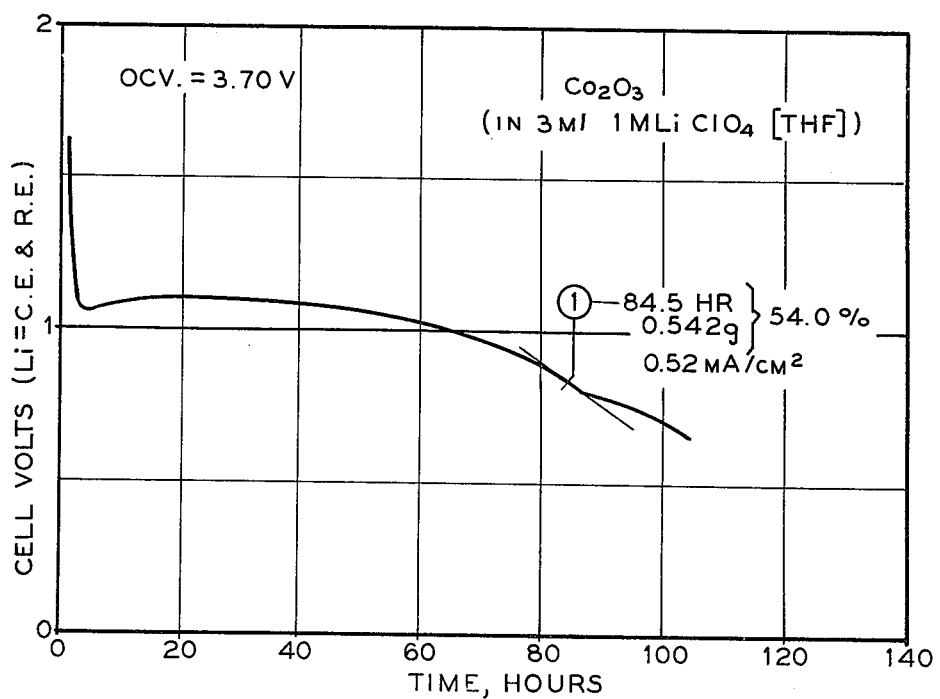

2. $Li/Co_2O_3$ cells were constructed using methods similar to that described in Example 1. The open circuit voltage of the cells was found to be 3.7 volts. The cells were discharged at a constant current of 2.25 ma (0.52 ma/cm²). The typical discharge curve is shown in FIG. 2. The voltage dropped to 1.1 volt on the passage of current and remained relatively steady thereafter. The material utilization efficiency, based on the complete reduction to the metal was found to be 54%.

The use of $Co_2O_3$ in wet cells was thus made possible by the choice of organic solvent and lithium anode.

The voltage of $NiO_2$ cells was thus considerably improved over the alkaline Ni-Cd or Ni-Zn cells, by using the lithium anode in organic electrolytes.

In a similar fashion it is thought that sodium, potassium, aluminum, magnesium, calcium, and beryllium as an anode material will result in beneficial results as does lithium.

THE SCOPE OF THE INVENTION

The invention is applicable to all primary cells with:

1. light metal anodes, e.g., Li, Na, K, Al, Mg, Ca and Be 2. organic solvents such as tetrahydrofuran, N-nitrosodimethylamine, dimethyl sulfite, propylene carbonate, dimethyl sulfoxide, dimethyl formamide, gamma-butyrolactone, dimethyl carbonate, methyl formate, butylformate, acetonitrile, dimethoxy ethane and the mixtures thereof.

3. electrolytes comprising above solvents and all soluble salts of Li, Na, K, Mg, Be, Ca and Al. The perchlorates, hexafluorophosphates, tetrafluoroborates, tetrachloroaluminates, hexafluoroarsenates, of lithium are particularly suitable.

What is claimed is:

1. A high energy density cell comprising a positive electrode composed of a cobalt oxide positive electrode material selected from the group consisting of $Co_2O_3$ and $Co_3O_4$ and mixtures thereof; a negative electrode consisting of a metal selected from the group of light metals; said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxyethane, acetonitrile, and the mixtures thereof, and having dissolved therein soluble salts of the light metals, wherein said soluble salts are selected from the group consisting of perchlorates, hexafluorophosphates, tetrafluoroborates, tetrachloroaluminates, and hexafluoroarsenates.

2. The battery according to claim 1 in which the negative electrode is composed of lithium, and the electrolyte is composed of a solution of lithium perchlorate in tetrahydrofuran.

3. The cell according to claim 2 in which the positive electrode comprises a mixture of said positive electrode material with an electronically conductive diluent.

4. The cell according to claim 3 wherein said electronically conductive diluent is graphite.

5. In the cell according to claim 2 wherein said positive electrode mixture includes a binder of a polyfluorinated hydrocarbon.

* * * * *